United States Patent
Jiang et al.

(10) Patent No.: US 10,062,387 B2
(45) Date of Patent: Aug. 28, 2018

(54) SYSTEMS AND METHODS FOR CONTACTING EMERGENCY PERSONNEL VIA VOICE RECOGNITION

(71) Applicant: Honeywell International Inc., Morristown, NJ (US)

(72) Inventors: Qian Jiang, Shanghai (CN); Yekun Gao, Shanghai (CN); Xinyu Ma, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/017,155

(22) Filed: Feb. 5, 2016

(65) Prior Publication Data
US 2017/0229125 A1    Aug. 10, 2017

(51) Int. Cl.
G10L 21/00        (2013.01)
G10L 17/22        (2013.01)
G10L 15/18        (2013.01)

(52) U.S. Cl.
CPC .......... *G10L 17/22* (2013.01); *G10L 15/1822* (2013.01)

(58) Field of Classification Search
USPC ......................... 704/246, 247, 251, 252, 275
See application file for complete search history.

(56) References Cited

U.S. PATENT DOCUMENTS

| | | | | |
|---|---|---|---|---|
| 5,918,222 A * | 6/1999 | Fukui | ...................... | G06Q 10/10 |
| 7,574,357 B1 * | 8/2009 | Jorgensen | ............... | G10L 15/24 704/201 |
| 8,527,278 B2 * | 9/2013 | David | ................. | G06F 17/2785 340/5.2 |
| 2007/0198850 A1 | 8/2007 | Martin et al. | | |
| 2008/0172232 A1 | 7/2008 | Gurley | | |
| 2008/0284587 A1 * | 11/2008 | Saigh | ................ | H04M 1/72541 340/539.13 |
| 2013/0223696 A1 * | 8/2013 | Azar | ................... | G06K 9/00892 382/118 |
| 2014/0059673 A1 * | 2/2014 | Azar | ....................... | G06F 21/32 726/19 |
| 2014/0066000 A1 | 3/2014 | Butler | | |
| 2014/0231166 A1 * | 8/2014 | Miller | ................... | B60W 40/08 180/272 |
| 2015/0022347 A1 | 1/2015 | Aswath et al. | | |

(Continued)

FOREIGN PATENT DOCUMENTS

GB          2 393 830 A      4/2004

OTHER PUBLICATIONS

Extended European search report from corresponding EP patent application 17151692.5, dated Jun. 13, 2017.

*Primary Examiner* — Leonard Saint Cyr
(74) *Attorney, Agent, or Firm* — Husch Blackwell LLP

(57) ABSTRACT

Systems and methods for contacting emergency personnel via voice recognition are provided. Some methods include detecting and identifying, via the voice recognition, a first predetermined phrase, detemiining whether a second predetermined phrase is detected and identified, via the voice recognition, within a predetermined period of time after detection and identification of the first predetermined phrase, and when the second predetermined phrase is detected and identified within the predetermined period of time, contacting the emergency personnel.

8 Claims, 7 Drawing Sheets

(56) References Cited

U.S. PATENT DOCUMENTS

| | | | | |
|---|---|---|---|---|
| 2015/0031325 A1* | 1/2015 | Huh | ............... | H04W 4/22 |
| | | | | 455/404.2 |
| 2015/0039303 A1* | 2/2015 | Lesso | ............... | G10L 15/28 |
| | | | | 704/233 |
| 2015/0103982 A1* | 4/2015 | O'Conor | ............... | H04M 3/5116 |
| | | | | 379/45 |
| 2015/0358796 A1* | 12/2015 | Sarna, II | ............... | H04W 4/22 |
| | | | | 455/404.2 |

\* cited by examiner

SYSTEMS AND METHODS FOR CONTACTING EMERGENCY PERSONNEL VIA VOICE RECOGNITION

FIELD

The present invention relates generally to systems and methods for contacting emergency personnel. More particularly, the present invention relates to systems and methods for contacting the emergency personnel via voice recognition.

BACKGROUND

Systems and methods to prevent an intruder, such as a thief, from breaking into a monitored region, such as a home, in an unauthorized manner are known. However, it is possible that the intruder can force an authorized occupant of the monitored region, such as a home owner, to disarm a security system, thereby ending monitoring of the region or alerting emergency personnel that a previously activated security system alarm does not need further attention.

In view of the above, there is a continuing, ongoing need for improved systems and methods.

DETAILED DESCRIPTION

Figure 1:
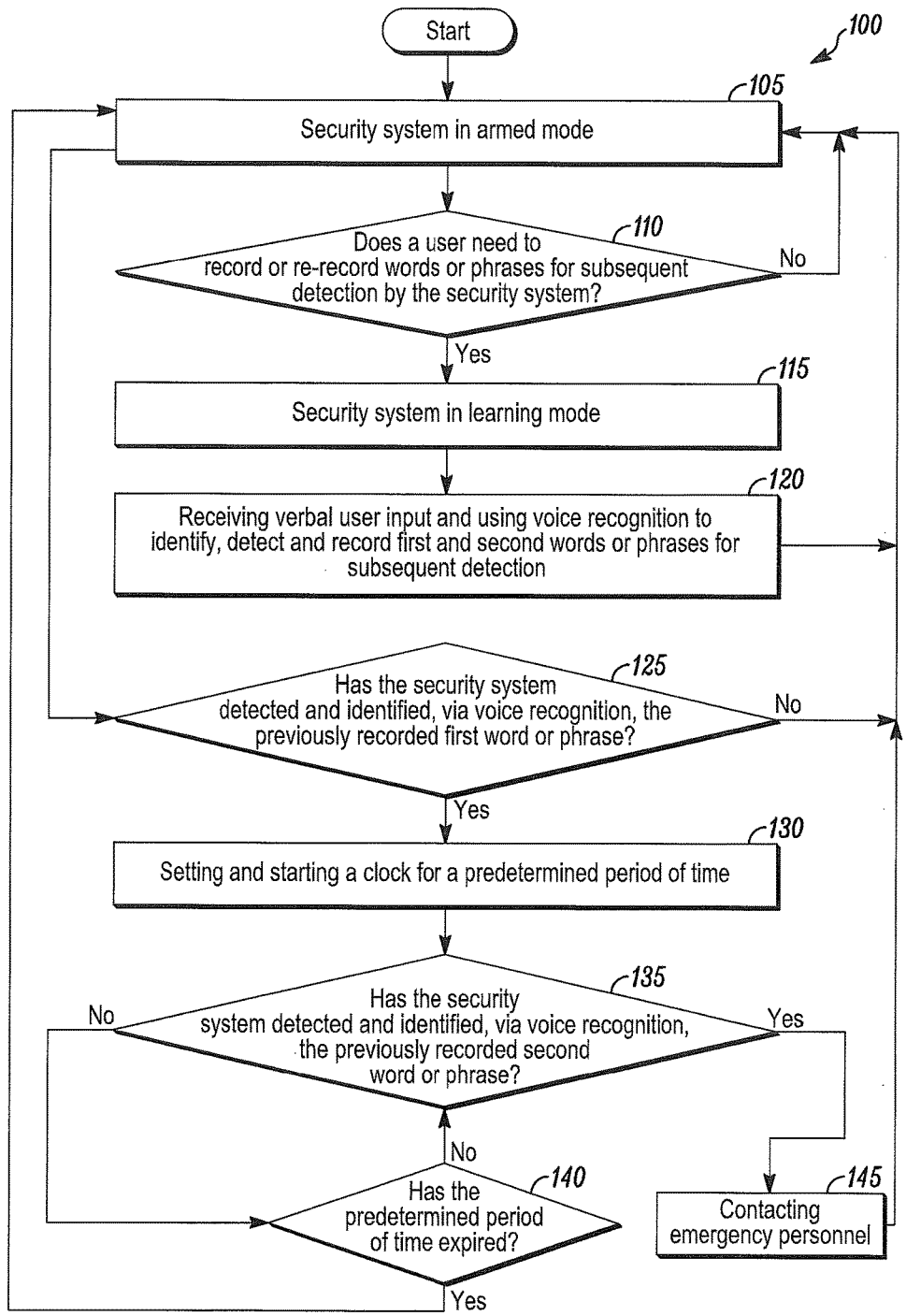
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for contacting emergency personnel via voice recognition. For example, when an intruder has entered a monitored region, an authorized occupant of the monitored region can take an action that is detected and identified by a security system as instructions to contact the emergency personnel, such as police, but that fails to alert the intruder of the authorized occupant's request to contact the emergency personnel.

In accordance with disclosed embodiments, systems and methods disclosed herein can include the voice recognition. Accordingly, systems and methods can facilitate users contacting the emergency personnel from anywhere within a monitored region and without making contact with the security system monitoring the region.

In some embodiments, systems and methods disclosed herein can detect and identify a first predetermined condition, and if systems and methods disclosed herein detect and identify a second predetermined condition within a predetermined period of time after detection and identification of the first predetermined condition, then systems and methods disclosed herein can contact the emergency personnel. However, if systems and methods disclosed herein fail to detect and identify the second predetermined condition within the predetermined period of time after detecting and identifying the first predetermined condition, then systems and methods disclosed herein can abstain from contacting the emergency personnel. Because the detection and identification of both of the first and second predetermined conditions are required prior to contacting the emergency personnel, the likelihood of a false alarm, such as contacting security personnel when not necessary, can be reduced.

According to disclosed embodiments, the first and second predetermined conditions can include systems and methods identifying and detecting, via the voice recognition, first and second predetermined words or phrases. For example, the first predetermined condition can include systems and methods disclosed herein identifying and detecting, via the voice recognition, the phrase "Don't hurt me" said by the authorized occupant of the monitored region, and the second predetermined condition can include systems and methods disclosed herein identifying and detecting, via the voice recognition, the word "Please" said by the authorized occupant of the monitored region. In some embodiments, systems and methods disclosed herein can identify and detect each of the first and second predetermined words or phrases said individually or within a larger phrase or sentence.

In some embodiments, the users of systems and methods disclosed herein, such as the authorized occupant of the monitored region, can configure the first and second predetermined conditions, for example, by identifying the first and second predetermined words or phrases. For example, systems and methods can be placed in a voice recognition mode for learning the first and second predetermined conditions and the first and second predetermined words or phrases as disclosed herein before being placed in an armed or ready mode for monitoring the region. For effectiveness, it is preferred that the first and second predetermined words or phrases are not otherwise likely to be said together or within the predetermined period of time.

In some embodiments, after systems and methods disclosed herein identify the first predetermined word or phrase, systems and methods disclosed herein can start a timer to continuously monitor for the detection and identification of the second predetermined word or phrase. If the second predetermined word or phrase is detected and identified within the predetermined period of time, then systems and methods disclosed herein can contact the emergency personnel, for example, by calling local police, without alerting the intruder of such contact. However, if the second predetermined word or phrase is not detected and identified within the predetermined period of time, then systems and methods disclosed herein can abstain from contacting the emergency personnel and continue monitoring the region.

FIG. 1 is a flow diagram of a method 100 in accordance with disclosed embodiments. As seen in FIG. 1, the method 100 can include a security system being placed in an armed mode as in 105 and determining whether a user needs to record or re-record words or phrases for subsequent detection by the security system as in 110. If not, then the method 100 can stay in the alarm mode as in 105.

However, if the method 100 determines that the user needs to record or re-record the words or phrases as in 110, then the method 100 can include the security system being placed in a learning mode as in 115. Once in the learning mode, the method 100 can include receiving verbal user input and using voice recognition to identify, detect, and record first and second words or phrases for subsequent detection by the security system 120. After recording the first and second words or phrases identified and detected as in 120, the method 100 can include the security system re-entering the armed mode as in 105.

When in the armed mode as in 105, the method 100 can include determining whether the security system has detected and identified a first predetermined condition as in 125. For example, the method 100 can determine whether the security system has detected and identified, via the voice recognition, the first word or phrase previously recorded. If not, then the method 100 can continue operation as in 105. However, when the method 100 determines that the security system has detected and identified the first predetermined condition as in 125, the method 100 can include setting and starting a clock for a predetermined period of time as in 130 and determining whether the security system has detected and identified a second predetermined condition as in 135. For example, the method 100 can determine whether the security system has detected and identified, via the voice recognition, the second word or phrase previously recorded. If not, then the method 100 can include determining whether the predetermined period of time has expired as in 140. If so, then the method 100 can continue operation as in 105. However, if the method 100 determines that the predetermined period of time has not yet expired as in 140, then the method can continue determining whether the security system has detected and identified the second predetermined condition as in 135.

When the security system has detected and identified the second predetermined condition as in 135, the method 100 can include contacting emergency personnel as 145.

The method 100 of FIG. 1 and others in accordance with disclosed embodiments can be executed via a security system that includes a control panel local to a monitored region. In some embodiments, the security system can include one or more microphones dispersed throughout the monitored region for receiving verbal user input for subsequent voice recognition by the security system. For example, in some embodiments, the control panel can include a microphone in or on the control panel.

Figure 2:
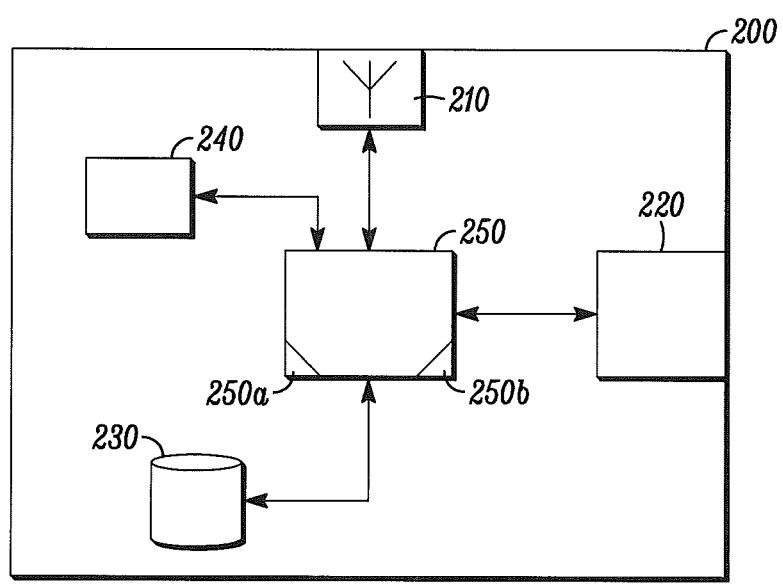
FIG. 2 is a block diagram of a system in accordance with disclosed embodiments.

FIG. 2 is a block diagram of a system 200 in accordance with disclosed embodiments. For example, in some embodiments, the system 200 can include a control panel of a security system. However, in some embodiments, the system 200 can include a user's cellular telephone or other personal digital assistant that is in communication, either directly or indirectly, with the security system as disclosed herein.

As seen in FIG. 2, the system 200 can include can include a wired or wireless transceiver 210, a user interface device 220, a database device 230, and a microphone 240, each of which can be in bidirectional communication with control circuitry 250, one or more programmable processors 250a, and executable control software 250b as would be understood by one of ordinary skill in the art. The executable control software 250b can be stored on a transitory or non-transitory computer readable medium, including, but not limited to, local computer memory, RAM, optical storage media, magnetic storage media, flash memory, and the like. In some embodiments, the control circuitry 250, the programmable processors 250a, and the executable control software 250b can execute and control the methods describe above and herein.

In some embodiments, the system 200 can communicate with a remote monitoring station via the transceiver 210, and in some embodiments, the system 200 can communicate with emergency personnel via the transceiver 210. For example, in some embodiments, the system 200 can call police on a telephone network via the transceiver 210.

The user interface device 220 can include one or more user input mechanisms and one or more user output mechanisms. For example, in some embodiments, the user interface device 220 can display each of the exemplary screens shown in FIGS. 3-7 for communicating with the user.

Figure 3:
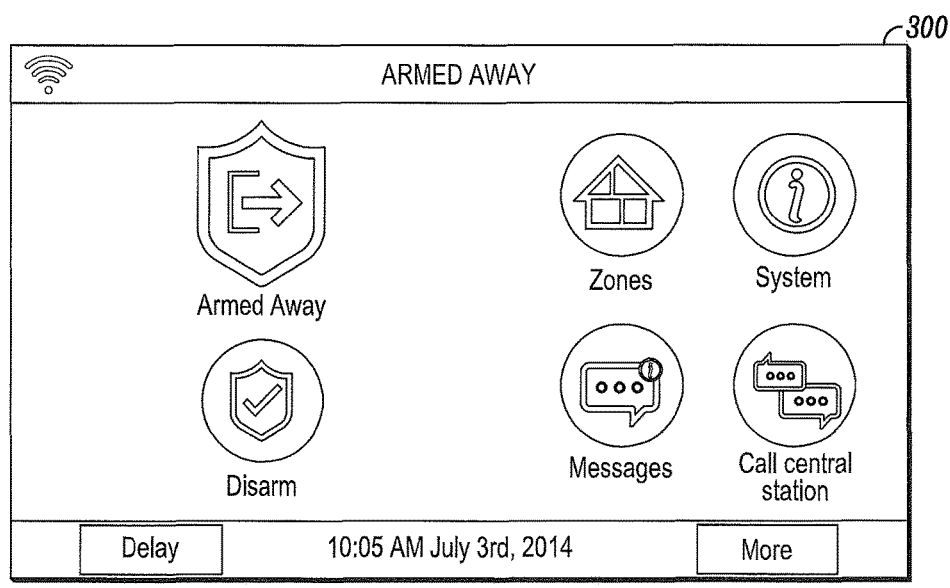
FIG. 3 is a screen shot of a screen displayed on a user interface device of a system in accordance with disclosed embodiments.
Figure 4:
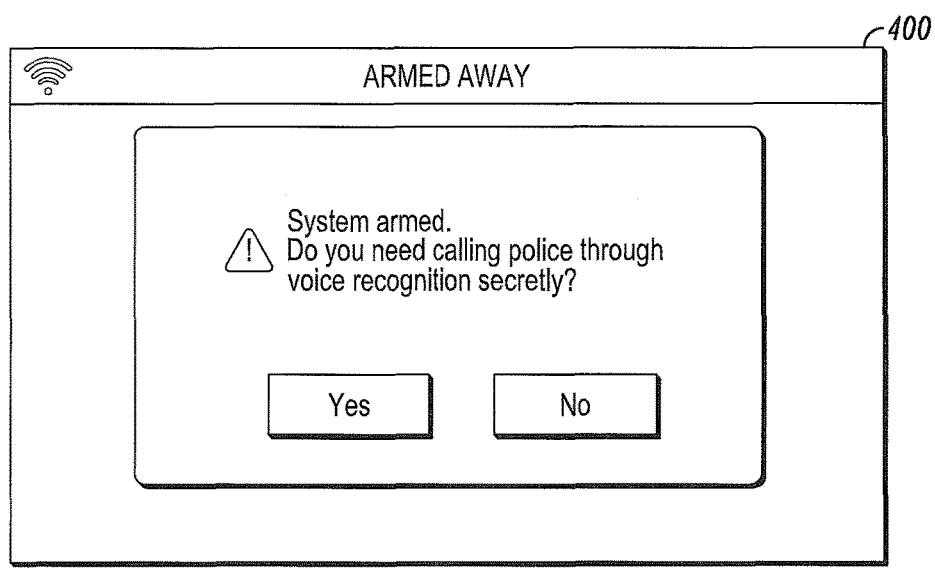
FIG. 4 is a screen shot of a screen displayed on a user interface device of a system in accordance with disclosed embodiments.
Figure 5:
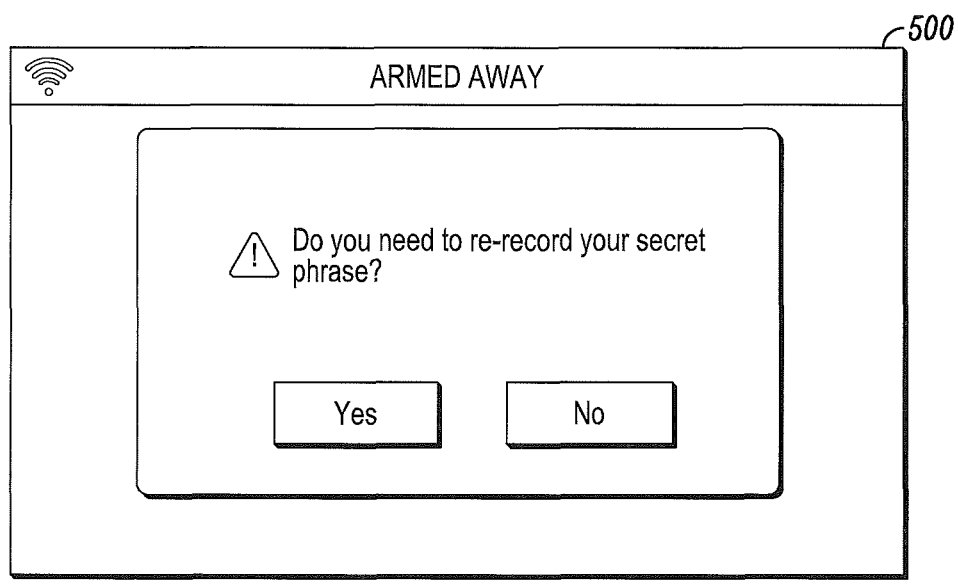
FIG. 5 is a screen shot of a screen displayed on a user interface device of a system in accordance with disclosed embodiments.

When the system 200 is in an armed mode, the user interface device 220 can display the screen 300 shown in FIG. 3 that, for example, displays information and options for the user. However, when the user provides input indicative of a need to enter a learning mode or the system 200 identifies the need to enter the learning mode, the user interface device 220 can display the screen 400 shown FIG. 4 to solicit whether the user wishes to enable a security feature of contacting the emergency personnel responsive to voice recognition as described above and herein and/or can display the screen 500 shown in FIG. 5 to determine whether the user needs to re-record previously recorded words or phrases for the voice recognition thereof.

Figure 6:
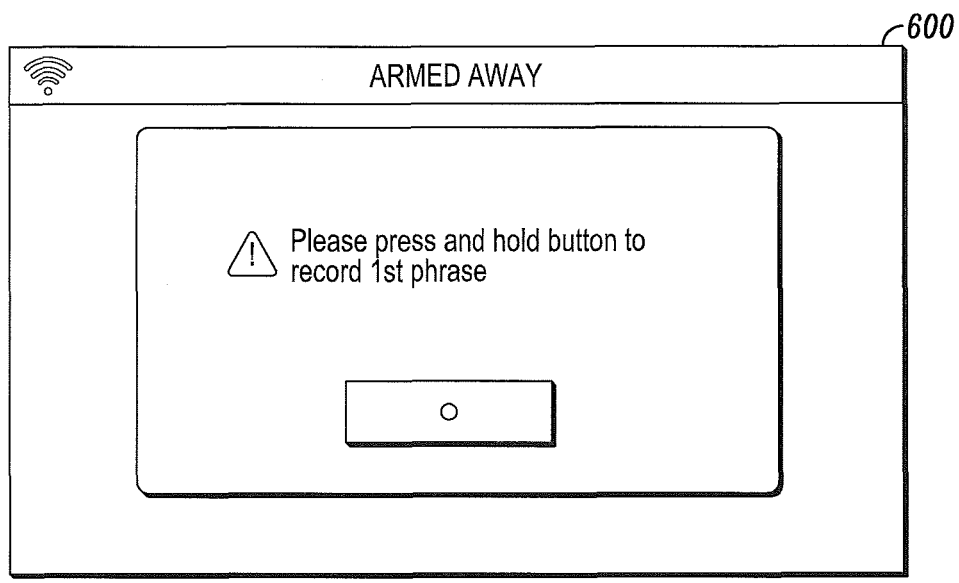
FIG. 6 is a screen shot of a screen displayed on a user interface device of a system in accordance with disclosed embodiments.
Figure 7:
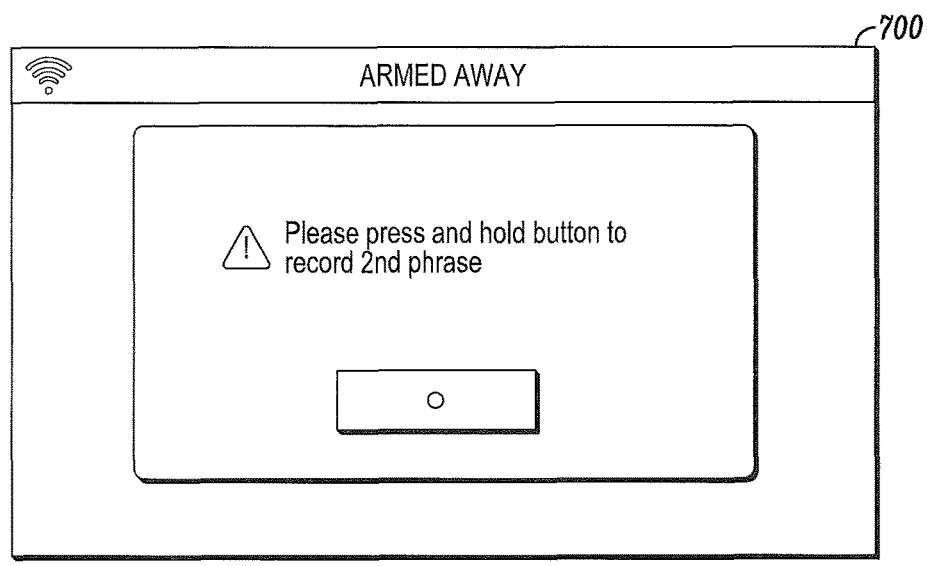
FIG. 7 is a screen shot of a screen displayed on a user interface device of a system in accordance with disclosed embodiments.

If the user provides affirmative input to the user interface device 220 displaying the screen 400 or the screen 500, then the user interface device 220 can subsequently and successively display the screen 600 shown in FIG. 6 and the screen 700 shown in FIG. 7 to detect, identify, and record or re-record first and second words or phrases said by the user for subsequent detection and identification by the security system. For example, the microphone 240 can receive the first and second words or phrases said by the user, and the first and second words or phrases received can be saved or recorded in the database device 230.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
a control panel of a security system receiving user input, via a user interface device, to enable a voice recognition emergency contact feature;
the control panel recording, via a microphone of the user interface device, and storing, in a database device, a first recording of a first word or phrase spoken by an authorized user of the security system;
the control panel recording, via the microphone, and storing, in the database device, a second recording of a second word or phrase spoken by the authorized user, the second word or phrase being different from the first word or phrase;

the control panel detecting and identifying the first word or phrase by comparing audio of the authorized user taken, via the microphone, from a region monitored by the security system to the first recording of the first word or phrase when the security system is in an armed mode;

responsive to detecting and identifying the first word or phrase, the control panel initiating a timer for a predetermined period of time;

responsive to initiation of the timer, the control panel monitoring the audio of the authorized user for the second word or phrase for the predetermined period of time as measured by the timer by comparing the audio of the authorized user to the second recording of the second word or phrase;

the control panel stopping and resetting the timer when the second word or phrase fails to be detected or identified within the predetermined period of time; and the control panel contacting emergency personnel when the second word or phrase is detected and identified within the predetermined period of time.

2. The method of claim 1 wherein the control panel detecting and identifying the first word phrase or the second word or phrase includes the control panel detecting and identifying the first word or phrase or the second word or phrase when said individually.

3. The method of claim 1 wherein the control panel detecting and identifying the first word or phrase or the second word or phrase includes the control panel detecting and identifying the first word or phrase or the second word or phrase when said within a larger phrase.

4. The method of claim 1 further comprising:

when the second word or phrase is detected or identified after expiration of the predetermined period of time, abstaining from contacting the emergency personnel; and when the second word or phrase fails to be detected and identified, abstaining from contacting the emergency personnel.

5. A security system comprising:

a control panel;

a database device; and a user interface device, wherein the user interface device receives user input to enable a voice recognition emergency contact feature, wherein the control panel records, via a microphone of the user interface device, and stores, in the database device, a first recording of a first word or phrase spoken by an authorized user of the security system, wherein the control panel records, via the microphone, and stores, in the database device, a second recording of a second word or phrase spoken by the authorized user of the security system, wherein the second word or phrase is different than the first word or phrase, wherein the control panel detects and identifies the first word or phrase by comparing audio of the authorized user taken, via the microphone, from a region monitored by the security system to the first recording of the first word or phrase when the security system is in an armed mode and, responsive thereto, initiates a timer for a predetermined period of time, wherein, in response to initiation of the timer, the control panel monitors the audio of the authorized user for the second word or phrase for the predetermined period of time by comparing the audio of the authorized user to the second recording of the second word or phrase, wherein the control panel stops and resets the timer when the second word or phrase fails to be detected or identified within the predetermined period of time, and wherein, when the control panel detects and identifies the second word or phrase within the predetermined period of time, the control panel contacts emergency personnel.

6. The system of claim 5 wherein the control panel detecting and identifying the first word or phrase or the second word or phrase includes the control panel detecting and identifying the first word or phrase or the second word or phrase when said individually.

7. The system of claim 5 wherein the control panel detecting and identifying the first word or phrase or the second word or phrase includes the control panel detecting and identifying the first word or phrase or the second word or phrase when said within a larger phrase.

8. The system of claim 5 wherein, when the control panel detects or identifies the second word or phrase after expiration of the predetermined period of time, the control panel abstains from contacting the emergency personnel, and when the control panel fails to detect and identify the second word or phrase, the control panel abstains from contacting the emergency personnel.

* * * * *